United States Patent Office 2,865,777
Patented Dec. 23, 1958

2,865,777

METHOD OF PREPARING A SILICEOUS PIGMENT

Edward M. Allen, Doylestown, Ohio, and Raymond S. Chisholm, Pittsburgh, Pa., assignors to Columbia-Southern Chemical Corporation No Drawing. Application July 6, 1955
Serial No. 520,373

5 Claims. (Cl. 106—288)

This invention relates to an especially useful type of siliceous pigment which can be prepared by an unusually economical process. It is common knowledge that silica or hydrated silica may be prepared by the reaction of certain salts of silicic acid with acids whereby, upon acidification, silica is formed. The types of silica thus prepared must meet rigid requirements for use as reinforcing pigments in rubber and paper compositions. Should the dried silica be too highly agglomerated or insufficiently fine, for instance, it would not meet said requirements.

By following special precautions it is possible to prepare a finely divided precipitated silica which is useful as a rubber or paper pigment. Such silica which is now on the market has an average ultimate particle size below 0.05 micron. Because of its small particle size, however, recovery of such silica from the aqueous medium in which it is produced is quite expensive since settling and filtration processes are slow and thus a large amount of expensive equipment is necessary, even for a relatively low rate of production.

In accordance with the present invention a novel type of siliceous pigment has been made which not only has excellent properties and is particularly useful in the reinforcement of rubber compositions but also settles rapidly and can be filtered readily from aqueous medium. Hence, the pigment herein contemplated can be made at a low cost.

The pigment prepared by the process herein contemplated comprises a finely divided hydrated silica having an average ultimate particle size below 0.1 micron, preferably 0.01 to 0.05 micron, and an average surface area ranging from 50 to 300 square meters per gram, preferably from 80 to 200 square meters per gram, as determined by the Brunauer-Emmett-Teller method, and finely divided alkaline earth metal sulfite having an average ultimate particle size below about 10 microns, preferably in the range of 0.01 to 2 microns. The ultimate particle size stated above may be determined by photomicrograph obtained by using the electron microscope.

This pigment may be prepared by reacting a particular solution containing sulfite ions and alkaline earth metal ions with an alkali metal silicate. Thus, by mixing a solution of an alkali metal silicate, such as sodium silicate, with a solution containing alkaline earth metal ions and sulfite ions under certain conditions a pigment containing $SiO_2$ and the corresponding alkaline earth metal sulfite may be produced. Very good results obtain when the solutions are mixed under conditions of violent agitation. Particularly suitable for this purpose is a centrifugal pump, although any means affording violent intermixing of the reactants is suitable.

The solution containing alkaline earth metal ions and sulfite ions may be prepared, for example, by introducing $SO_2$ into a calcium chloride solution.

According to one method, an aqueous calcium chloride solution and sulfur dioxide may be fed simultaneously into a centrifugal pump at such a rate as to dissolve a desired amount of $SO_2$ in the calcium chloride solution. It has been found convenient to introduce the $SO_2$ into a solution of calcium chloride having a concentration of approximately 100 grams per liter, although a concentration in the range of 75 to about 175 grams per liter may be used.

It was discovered according to the present invention that precipitation of $CaSO_3$ does not occur, as would be expected, when the aqueous $CaCl_2$ solution and $SO_2$ are admixed.

Alternatively, the $SO_2$ gas may be bubbled into a calcium chloride solution such as to produce a resulting solution containing varying concentrations of calcium chloride and $SO_2$. When using a centrifugal pump it may be desirable to recirculate the resulting calcium chloride-$SO_2$ solution to the pumps and continue the addition of $SO_2$ until the desired amount of $SO_2$ has been dissolved in the calcium chloride solution. Thus, an aqueous medium containing calcium chloride and $SO_2$ may be produced, the calcium chloride being present in stoichiometric quantity, based on the $SO_2$ content, or in stoichiometric excess ranging from about 1 to about 500 percent by weight, the concentration of said calcium chloride being in the range of 75 to about 175 grams per liter. A preferred range of excess calcium chloride is from 10 to 350 percent by weight. The exact concentration used to react with the alkali metal silicate solution depends, of course, upon the temperature conditions, the concentration of $SiO_2$ in the alkali metal silicate solution, the rate of addition of the reactant solutions, etc.

Although calcium chloride is the preferred alkaline earth metal compound for use in the present invention, other sources of alkaline earth metal ions, such as calcium hydroxide, barium chloride, barium hydroxide, or the like, may be employed. The alkaline earth metal compound should have a greater solubility in the aqueous medium of the reaction than its corresponding alkaline earth metal sulfite. Furthermore, for ease of operation, the alkaline earth metal compound should not be such as to precipitate out its $SO_2$ derivative prior to reaction with the alkali metal silicate constituent. For instance, when using calcium hydroxide instead of calcium chloride it is advisable to maintain a concentration of $SO_2$ sufficient to avoid said precipitation.

It will become more and more apparent as the invention is elaborated upon hereinafter that, for best results, there should be a careful correlation of all reaction concentrations and conditions in order to produce the particular pigment of the present invention. It is advantageous to so correlate these concentrations and conditions that the resulting pigment will meet specific surface area requirements. Since, in defining an invention of this nature, a number of variables come into play, said variables having their own peculiar ranges, it has been found efficient and expedient to define the present invention in terms of a correlation of the many variables to produce a pigment having surface areas within a particular range.

The alkali metal silicate used normally in this invention is sodium silicate, although other alkali metal silicates, such as potassium silicate, may be employed. Generally, the sodium silicate used should have the composition $Na_2O(SiO_2)_x$, where $x$ is at least 2, usually 2 to 4, including fractional numbers, preferably in the range of 3 to 4.

Aqueous silicate solutions containing about 45 to 200 grams per liter of $SiO_2$ are generally used. Particularly desirable results obtain using an alkali metal silicate solution having an $SiO_2$ concentration ranging from about 50 to 175 grams per liter. Here again, the concentration must be so correlated with the remaining variables as to produce a pigment having the desired surface area. Thus, when a sodium silicate $Na_2O(SiO_2)_{3.36}$ solution containing 100 grams per liter $SiO_2$ and a calcium chloride-sulfur dioxide solution containing 95 grams per liter of calcium chloride, the calcium chloride being in a stoichiometric excess of 300 percent by weight based on the equivalent $SO_2$ content, are fed to a centrifugal pump at such a rate as to produce a slurry having a pH of 8.2, said slurry emanating from the pump at 115° F., a pigment having a surface area of about 116 square meters per gram is produced. However, in a reaction wherein the $SiO_2$ concentration is 74 grams per liter, the $CaCl_2$—$SO_2$ solution contains 100 grams per liter of $CaCl_2$, the $CaCl_2$ being present in an excess of 143 percent by weight, based on the $SO_2$ content therein, and the reactants are fed to a centrifugal pump at such a rate as to produce a slurry having a pH of 8.3 and the temperature of slurry emanating from the pump is 140° F., a pigment having a surface area of about 136 square meters per gram is produced. It will be noted that each of these pigments is very desirable, yet substantial variations in the concentrations of the reactants and the temperature conditions are noticeable.

The temperature employed in the type of reaction herein disclosed may vary from not substantially less than room temperature to about 212° F. Of course, by controlling the pressure on the system, higher temperatures may be employed. As has just been shown, low temperatures may require higher stoichiometric excesses of calcium chloride. On the other hand, all other conditions being equal in the former illustration, temperatures as high as 212° F. will produce a very good pigment.

A very efficient method of preparing the pigments of this invention comprises using a centrifugal pump, as hereinabove stated, as the reactor. Not only is continuous operation feasible thereby, but very efficient agitation of the reactants results. For instance, the solution containing alkaline earth metal ions and $SO_2$ may be introduced into the pump at a controlled rate through one of the two concentrically-located tubes while simultaneously introducing the alkali metal solution through the remaining tube, the reaction product being continuously removed from the pump through a separate outlet. Still another modification would consist in admixing, by means of a forked inlet, the reactants just prior to their entry into the pump. Multiple inlets and outlets on the pump for better intermingling of the reactants and more efficient removal of the product may be advantageously used also.

According to a still further modification, it may be desirable to arrange several pumps in series whereby, for instance, the calcium chloride and sulfur dioxide solution may be prepared in the first centrifugal pump, removed therefrom and introduced into one of the two concentric inlets in a second pump, the remaining inlet receiving therethrough a sodium silicate solution. Obviously, many ramifications of this process are within the scope of the present invention. For example, in the interest of more complete reaction or greater reactant concentrations, it may be advantageous to recycle products to the pump or pumps from which they are removed.

Alternatively, the reaction may be carried out in a jet mixing device consisting of a T-shaped tube. For instance, a sodium silicate solution may be injected at right angles into a tube containing a rapidly flowing $CaCl_2$—$SO_2$ solution, the velocity of each solution being carefully governed. Such devices are well known to be effective mixers due to highly turbulent flow conditions at the point of junction of the two streams.

Suitable temperature conditions may be effected in the pump process by providing a continuous flow of steam in the reactant streams. On the other hand, the reactants may be brought to suitable temperature prior to their introduction into the centrifugal pump or pumps, as the case may be. When using the jet mixing device above-mentioned, the reactants may be brought to proper temperatures by heating the outside of the tubes, thereby increasing the temperature of said reactants.

When employing a centrifugal pump as the reactor the reaction concentrations and conditions, such as rate of feed, should be controlled such that the product emanating from the reactor has a pH ranging from 5.2 to about 10, preferably about 6 to 9.5. It has been found that without this pH control either gelling results, which interferes with the proper functioning of the pump, or a watery gel yielding an inferior pigment is produced.

The silica-calcium sulfite pigment of this invention has a ratio of about 0.1 to about 0.75 mole of calcium sulfite per mole of $SiO_2$, preferably 0.3 mole $CaSO_3$ per mole of $SiO_2$.

Among the very desirable characteristics of the pigment prepared by this invention is its good dispersibility in rubber. The level of dispersibility of this pigment represents a substantial improvement over that of commercial finely-divided calcium silicate.

The pigment herein contemplated because of its unusually good dispersibility is particularly suitable as a rubber reinforcing pigment, especially for the reinforcement of rubber compositions including both natural rubber and synthetic rubber compositions. Typical of these compositions are the butadiene-styrene copolymers known as GR-S rubber, which are copolymers of 10 to 60 percent by weight of styrene and 90 to 40 percent by weight of butadiene; butadiene-acrylonitrile copolymers derived by copolymerization of 40 to 90 percent by weight of butadiene and 60 to 10 percent of acrylonitrile; neoprene rubber; isobutylene polymers and copolymers of isobutylene with 0.01 to 4.0 percent of isoprene (based upon the weight of isobutylene); other elastomers prepared by polymerization of butadiene-1,3, isoprene, piperylene, 2,3-dimethyl butadiene, 2-chloro-butadiene-1,3 or other comparable polymerizable compound alone or in admixture with one or more organic, monomeric or ethylenic compounds including acrylonitrile, isobutylene, vinyl chloride, vinyl acetate, styrene, methyl methacrylate, methyl alphachloroacrylate, methyl acrylate, and the like.

The following are typical standard rubber test recipes used to determine the physical characteristics of rubber products containing the pigment of the present invention:

TABLE I

| | A | B |
|---|---|---|
| | Parts by weight | Parts by weight |
| GR-S-1500 | 75.0 | 25.0 |
| #1 R. S. S. | | 55.0 |
| Marbon 8000 (styrene-butadiene resin) | 25.0 | 20.0 |
| Zinc oxide | 5.0 | 5.0 |
| Sulfur | 3.0 | 2.25 |
| Stearic acid | 1.0 | 2.0 |
| Santoflex B (reaction product of acetone and p-amino-diphenyl) | | 0.67 |
| Akroflex C (35% diphenyl-p-phenylenediamine, 75% phenyl-alpha-naphthylamine) | 1.0 | |
| Flexamine (65% of a complex diarylamine-ketone reaction product and 35% n,n'-diphenyl-p-phenylenediamine) | | 0.33 |
| Santocure (N-cyclohexyl-2 benzothiazole sulfenamide) | 1.0 | |
| Cumar MH 2½ (polymers of indene, coumarone and associated coal tar compounds) | 5.0 | 5.0 |
| D. O. T. G. (di-ortho-tolyl-guanidine) | 0.25 | 1.2 |
| Altax (benzothiazyl disulfide) | | 1.0 |
| Red iron oxide | | 4.0 |
| Carbowax 4000 (mixture of polyethylene glycols) | | 2.0 |
| Commercial calcium silicate | 90.0 | |
| Product of Example II | | 64.5 |

TABLE II

| | A | B |
|---|---|---|
| | Parts by weight | Parts by weight |
| GR-S-1000 | 100.0 | 100.0 |
| Zinc oxide | 5.0 | 5.0 |
| Sulfur | 2.0 | 3.0 |
| Phenyl-beta-naphthylamine | 1.0 | 1.0 |
| Thionex (tetramethyl thiuram monosulfide) | .35 | |
| Altax (benzothiazyl disulfide) | | 1.2 |
| Accelerator 808 (condensation product of butyraldehyde and aniline) | .15 | |
| Methyl tuads (tetramethyl thiuram disulfide) | | 0.15 |
| Circo oil | 5.0 | |
| Cumar MH 2½ (polymers of indene, coumarone and associated coal tar compounds) | | 15.0 |
| Glycol | | 3.5 |
| Commercial calcium silicate | 66.9 | |
| Product of Example II | | 58.5 |

The siliceous pigments prepared according to Examples I through VII, infra, when tested in the above standard rubber recipes, imparted properties of tensile, tear and flexure to said rubber far superior to those imparted by the abovementioned commercial calcium silicate. The rubber compounding needs of calcium silicate and the siliceous pigment of the present invention are necessarily different (as witnessed in Tables I and II above) owing to the curing rates of the respective pigments.

The present invention will be more fully understood by reference to the following illustrative examples:

Example I

A $CaCl_2$—$SO_2$ solution was prepared by introducing into the inner tube of two concentric feed tubes leading to the suction portion of a 1 inch Worthite centrifugal pump having a water-rated 40 gallon per minute capacity a 120 gram per liter solution of $CaCl_2$ at a rate of approximately 1 gallon per minute, the solution being procured from the bottom of a 100 gallon rubber-lined tank used for storage. Through the annular passage formed by the concentric feed tubes $SO_2$ gas was introduced into the pump and dissolved in the $CaCl_2$ solution at the rate of 3½ pounds of $SO_2$ per hour, the resulting product being discharged into the rubber-lined tank at a point intermediate the central portion of the body of solution and the upper liquid line. The resulting $CaCl_2$—$SO_2$ solution was recirculated to the pump through the inner tube and the $SO_2$ feed continued until a stoichiometric excess of $CaCl_2$, based on the $SO_2$ content therein, was obtained. The $SO_2$ feed was then turned off and the $CaCl_2$—$SO_2$ solution collected in the rubber-lined tank was adjusted with water to 100 grams per liter $CaCl_2$ content. This solution then contained a 435 percent stoichiometric excess of $CaCl_2$.

At ambient temperature (22° C., plus or minus 5° C.) the solution was reintroduced into the centrifugal pump through the same feed tube and simultaneously therewith, also at ambient temperature, a sodium silicate $$NaO(SiO_2)_{3.36}$$

solution having a concentration of 100 grams per liter of $SiO_2$ was introduced into the annular feed passage previously used to introduce $SO_2$. The sodium silicate feed rate was 2100 milliliters per minute while the $CaCl_2$—$SO_2$ feed rate was 3800 milliliters per minute.

The resulting slurry had a soft solid texture and a pH of 8.6. This slurry was then washed on a filter wheel and the resulting cake dried in an oven at 120° C. The product thus obtained was very soft and had a surface area of 112 square meters per gram.

Example II

A $CaCl_2$—$SO_2$ solution was prepared and admixed with an $Na_2O(SiO_2)_{3.36}$ solution in a centrifugal pump as in Example I, both solutions having the same concentrations as in Example I. The $CaCl_2$—$SO_2$ solution was introduced at a rate of 3600 milliliters per minute and the $Na_2O(SiO_2)_{3.36}$ solution at a rate of 1775 milliliters per minute. Simultaneously therewith steam was introduced into the reactor, the steam being also introduced into the reactor through the annular feed passage. The product slurry discharging from the pump was at a temperature of 105° F.

This slurry had a soft solid texture and a pH of 7.4. It was then washed and dried as in Example I. The product thus obtained had a surface area of 104 square meters per gram.

Example III

A $CaCl_2$—$SO_2$ solution was prepared as in Example I only not as much $SO_2$ was added and a stoichiometric excess of $CaCl_2$ of 143 percent by weight was realized, the concentration of $CaCl_2$ having been adjusted to 100 grams per liter as in Example I. This solution was then admixed with $Na_2O(SiO_2)_{3.36}$ (100 grams per liter) in a centrifugal pump as in Example I, only the $CaCl_2$—$SO_2$ solution was introduced at a rate of 4200 milliliters per minute and the $Na_2(SiO_2)_{3.36}$ solution at a rate of 5300 milliliters per minute, the $Na_2O(SiO_2)_{3.36}$ solution having been preheated to 200° F. The $CaCl_2$—$SO_2$ solution was introduced at ambient temperature.

The product slurry emitted from the pump had a soft solid texture and a pH of 9.5. It had a temperature of 105° F.

It was then washed and dried as in Example I. The product thus obtained had a surface area of 99 square meters per gram.

Example IV

A $CaCl_2$—$SO_2$ solution was prepared as in Example III having the same concentration and stoichiometric excess of $CaCl_2$. This solution was then admixed with $Na_2O(SiO_2)_{3.36}$ in a centrifugal pump as in Example III, only the $CaCl_2$—$SO_2$ solution was introduced at a rate of 3900 milliliters per minute and the $Na_2O(SiO_2)_{3.36}$ solution at a rate of 4800 milliliters per minute, the $Na_2O(SiO_2)_{3.36}$ solution having been preheated to 200° F. and having an $SiO_2$ concentration of only 74 grams per liter. The $CaCl_2$—$SO_2$ solution was introduced at ambient temperature. Some steam was introduced into the reactor through the annular feed passage along with the $Na_2O(SiO_2)_{3.36}$ solution.

The product slurry emitted from the pump had a soft solid texture and a pH of 8.3. It had a temperature of 140° F.

It was then washed and dried as in Example I. The product thus obtained had a surface area of 136 square meters per gram.

Example V

A $CaCl_2$—$SO_2$ solution was prepared as in Example I only not as much $SO_2$ was added and a stoichiometric excess of $CaCl_2$ of 114 percent by weight was realized. Furthermore, the $CaCl_2$ concentration was adjusted to 92 grams per liter instead of 100 as in Example I. This solution was then admixed with $Na_2(SiO_2)_{3.36}$ in a centrifugal pump as in Example I, only the $CaCl_2$—$SO_2$ solution was introduced at a rate of 2500 milliliters per minute and the $Na_2O(SiO)_{3.36}$ solution at a rate of 3490 milliliters per minute, the $Na_2O(SiO_2)_{3.36}$ solution having been preheated to 200° F. and having an $SiO_2$ concentration of 100 grams per liter. Steam was introduced into the reactor through the annular feed passage along with the $Na_2O(SiO_2)_{3.36}$ solution.

The product slurry emitted from the pump was fluid in nature and had a pH of 8.6. It had a temperature of 212° F. It was then washed and dried as in Example I. The product thus obtained had a surface area of 85 square meters per gram.

Example VI

A $CaCl_2$—$SO_2$ solution was prepared as in Example I only not as much $SO_2$ was added and a stoichiometric excess of $CaCl_2$ of 206 percent by weight was realized. Furthermore, the $CaCl_2$ concentration was adjusted to 94 grams per liter instead of 100 as in Example I. This solution was then admixed with $Na_2O(SiO_2)_{3.36}$ in a centrifugal pump as in Example I, only the $CaCl_2$—$SO_2$ solution was introduced at a rate of 4200 milliliters per minute and the $Na_2O(SiO_2)_{3.36}$ solution at a rate of 3450 milliliters per minute, the $Na_2O(SiO_2)_{3.36}$ solution having been preheated to 200° F. and having an $SiO_2$ concentration of 100 grams per liter. Steam was introduced into the reactor through the annular passage along with the $Na_2O(SiO_2)_{3.36}$ solution.

The product slurry emitted from the pump was fluid in nature and had a pH of 6.6. It had a temperature of 190° F. It was then washed and dried as in Example I. The product thus obtained had a surface area of 113 square meters per gram.

Example VII

A $CaCl_2$—$SO_2$ solution was prepared as in Example I only not as much $SO_2$ was added and a stoichiometric excess of $CaCl_2$ of 284 percent by weight was realized. Furthermore, the $CaCl_2$ concentration was adjusted to 95 grams per liter instead of 100 as in Example I. This solution was then admixed with $Na_2O(SiO_2)_{3.36}$ in a centrifugal pump as in Example I, only the $CaCl_2$—$SO_2$ solution was introduced at a rate of 3780 milliliters per minute and the $Na_2O(SiO_2)_{3.36}$ solution at a rate of 2950 milliliters per minute, the $Na_2O(SiO_2)_{3.36}$ solution having been preheated to 200° F. and having an $SiO_2$ concentration of 100 grams per liter. Steam was introduced into the reactor through the annular feed passage along with $Na_2O(SiO_2)_{3.36}$ solution.

The product slurry emitted from the pump was fluid in nature and had a pH of 7.2. It had a temperature of 212° F. It was then washed and dried as in Example I. The product thus obtained had a surface area of 103 square meters per gram.

Example VIII

A $CaCl_2$—$SO_2$ solution was prepared as in Example I only not as much $SO_2$ was added and a stoichiometric excess of $CaCl_2$ of 282 percent by weight was realized. Furthermore, the $CaCl_2$ concentration was adjusted to 95 grams per liter instead of 100 as in Example I. This solution was then admixed with $Na_2O(SiO_2)_{3.36}$ in a centrifugal pump as in Example I, only the $CaCl_2$—$SO_2$ solution was introduced at a rate of 3780 milliliters per minute and the $Na_2O(SiO_2)_{3.36}$ solution at a rate of 3050 milliliters per minute, the $Na_2O(SiO_2)_{3.36}$ solution having been preheated to 200° F. and having an $SiO_2$ concentration of 165 grams per liter. Steam was introduced into the reactor through the annular feed passage along with the $Na_2O(SiO_2)_{3.36}$ solution.

The product slurry emitted from the pump was fluid in nature and had a pH of 8.6. It had a temperature of 130° F. It was then washed and dried as in Example I. The product thus obtained had a surface area of 89 square meters per gram.

The expression "finely-divided siliceous pigment" as used in the instant disclosure is intended to exclude gel-type siliceous particulates.

Although the instant invention has been particularly described as to various embodiments thereof, such embodiments are not to be regarded as limitations upon the scope of the invention, except insofar as the appended claims impose limitations thereon.

We claim:
1. A method of preparing a finely-divided silica-alkaline earth metal sulfite pigment which comprises establishing a solution containing sulfite ions and alkaline earth metal ions dissolved therein, reacting said solution with an alkali metal silicate by admixing the reactants under conditions of vigorous agitation and at a controlled rate to produce a slurry having a pH in the range from about 5.2 to about 10 and recovering the resulting finely-divided, precipitated silica-alkaline earth metal sulfite pigment, said silica having an average ultimate particle size below 0.1 micron.

2. A method of preparing a finely-divided silica-alkaline earth metal sulfite pigment which comprises establishing a solution containing sulfite ions and alkaline earth metal ions dissolved therein, admixing said solution with an alkali metal silicate under conditions of vigorous agitation and at a controlled rate to produce a slurry having a pH in the range from about 5.2 to about 10 and comprising a finely-divided, precipitated silica-alkaline earth metal sulfite pigment, said silica having an average ultimate particle size below 0.1 micron, and removing said pigment from the zone of precipitation substantially as rapidly as formed.

3. The process of claim 1 wherein the solution containing sulfite ions and alkaline earth metal ions is prepared by the addition of $SO_2$ to an aqueous solution of calcium chloride, the alkali metal silicate is sodium silicate, and the resulting pigment is a finely-divided, precipitated, silica-calcium sulfite pigment.

4. The process of claim 2 wherein the solution containing sulfite ions and alkaline earth metal ions is prepared by the addition of $SO_2$ to an aqueous solution of calcium chloride, the alkali metal silicate is sodium silicate, and the resulting pigment is a finely-divided, precipitated, silica-calcium sulfite pigment.

5. A method of preparing a finely-divided silica-calcium sulfite pigment which comprises preparing a solution containing sulfite ions and calcium ions by introducing sufficient $SO_2$ into an aqueous solution of calcium chloride to produce a $CaCl_2$—$SO_2$ solution having a stoichiometric excess of $CaCl_2$, based on the $SO_2$ content therein, admixing the resulting solution with a sodium silicate solution under conditions of vigorous agitation and at a controlled rate to produce a slurry having a pH in the range from about 5.2 to about 10 and recovering the resulting finely-divided, precipitated silica-calcium sulfite pigment, said silica having an average ultimate particle size below 0.1 micron and a surface area of 50 to 300 square meters per gram.

References Cited in the file of this patent

UNITED STATES PATENTS

| Number | Name | Date |
|---|---|---|
| 1,842,394 | Endres | Jan. 26, 1932 |
| 1,984,188 | Haywood | Dec. 11, 1934 |
| 2,189,832 | Rafton | Feb. 13, 1940 |
| 2,204,113 | Allen | June 11, 1940 |
| 2,310,693 | Haywood | Feb. 9, 1943 |
| 2,314,188 | Allen | Mar. 16, 1943 |
| 2,679,463 | Alexander et al. | May 25, 1954 |
| 2,686,731 | Wainer | Aug. 17, 1954 |

FOREIGN PATENTS

| Number | Country | Date |
|---|---|---|
| 129,143 | Australia | Dec. 7, 1945 |